May 5, 1970 G. O. FREDRICKSON 3,510,699
VARIABLE RELUCTANCE ELECTRIC STEPPING MOTOR WITH BIAS
WINDING AND FIELD ENERGIZING CIRCUITRY
Filed Feb. 10, 1969
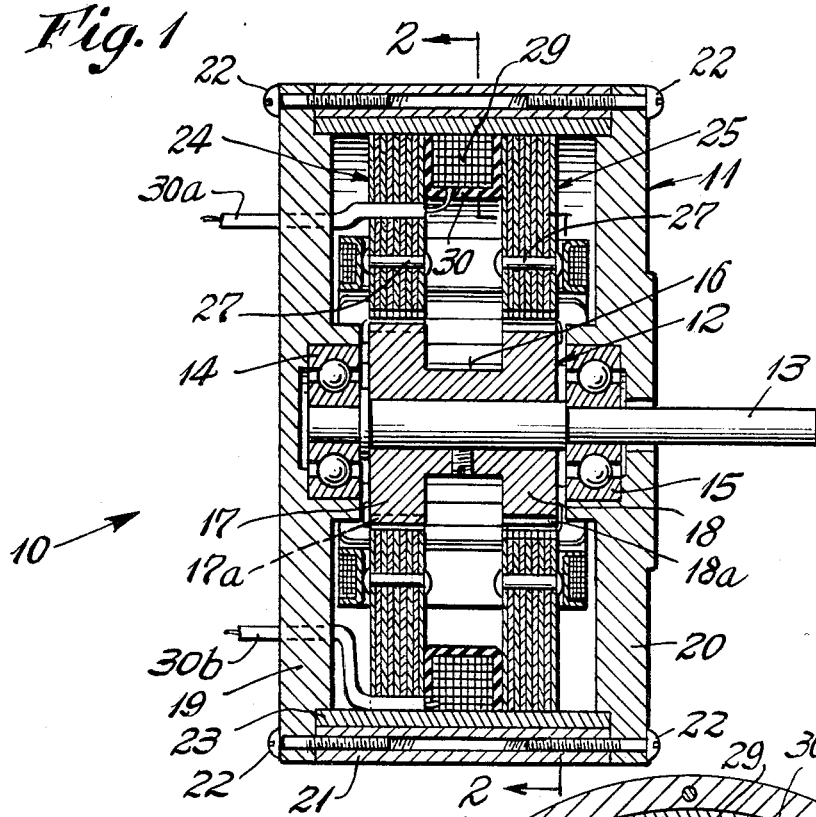
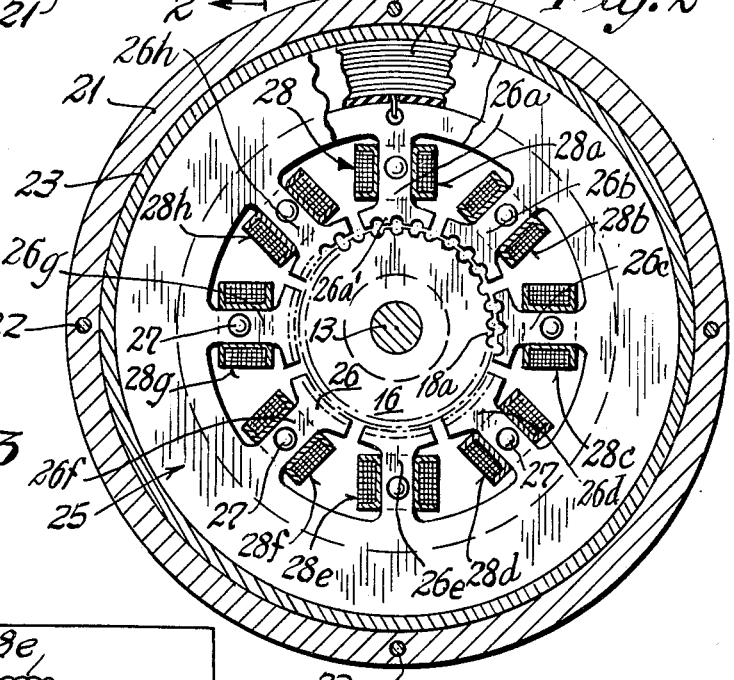
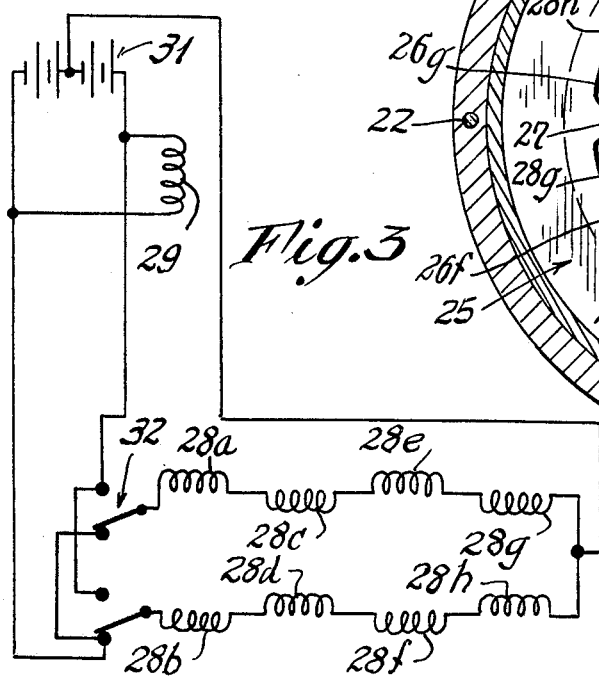
INVENTOR.
Gustav O. Fredrickson
BY
Johnson and Kline
ATTORNEYS

United States Patent Office 3,510,699
Patented May 5, 1970

3,510,699
VARIABLE RELUCTANCE ELECTRIC STEPPING MOTOR WITH BIAS WINDING AND FIELD ENERGIZING CIRCUITRY
Gustav O. Fredrickson, Granby, Conn., assignor to The Superior Electric Company, Bristol, Conn., a corporation of Connecticut
Filed Feb. 10, 1969, Ser. No. 798,047
Int. Cl. H02k 29/02, 37/00
U.S. Cl. 310—49                                    5 Claims

ABSTRACT OF THE DISCLOSURE

An electric stepping motor having a stator formed with a plurality of poles with teeth being formed on the pole's peripheries and with a winding associated with each pole; a rotor having end caps formed with teeth; in which the windings are sequentially energized to produce an altering magnetic flux while a unidirectional magnetic flux is produced by an electromagnetic coil in the stator with the fluxes coacting through the teeth to produce stepping movement when the magnetic flux is altered.

---

In my U.S. Pat. No. Re. 25,445, assigned to the assignee of the present invention, there is disclosed an electric stepping motor that produces a rotational step for each change of energization applied to its stator windings. The stator is formed to provide a plurality of inwardly extending poles with the periphery of the poles being formed with evenly spaced teeth. The rotor is also formed to have peripheral teeth with the rotor and stator teeth being coaxial and aligned.

Each of the stator poles has a winding associated therewith which upon energization produces a magnetic polarity in the pole's teeth. When some of the pole windings have their energization or polarity changed, the rotor is caused to move an incremental distance or are which is related to the number of poles and the tooth pitches. To increase the output torque of the motor and to provide directional stability, the rotor teeth are caused to have a unidirectional magnetic flux flow therein from a permanent magnet that is carried by, to form a part of, the rotor.

While such a motor has been found extremely satisfactory, it will be understood that the weight of the permanent magnet constitutes a mass that must be moved as the rotor moves. This weight, in a stepping motor, introduces limitations on the stepping rate by reason of a torque versus weight ratio where a larger mass magnet increases the torque but also increases the rotor inertia. Thus, attempts to increase the magnetic field of the permanent magnet by increasing its size have resulted in increased torque but yet have served to decrease the rate at which the motor may be stepped.

It is accordingly an object of the present invention to provide a stepping motor in which the permanent magnet is eliminated but yet in which a permanent magnetic field is still provided.

Another object of the present invention is to provide a stepping motor of the above type in which the strength of the permanent magnetic field may be altered or selected without increasing the weight of the rotor or substantially altering the structure of the motor.

A further object of the present invention is to provide a stepping motor that achieves the above objects but yet is extremely simple in construction, economical to manufacture, durable in use and may utilize a substantial number of presently available motor parts.

In carrying out the present invention, the stator is substantially identical to that disclosed in the above-noted Reissue Pat. No. 25,445 in that it has a plurality of equality spaced, inwardly extending poles with each pole having teeth formed on its periphery and a winding for magnetizing the pole. The rotor includes a shaft on which is mounted a cylindrical member having peripherally formed teeth that are positioned to be coaxial and aligned with the teeth on the stator poles. However, the toothed rotor member is formed of magnetizable material, such as bar stock steel, and may be a unitary piece but does not have any permanent magnetization. The windings of the stator poles are energized to magnetize their associated poles and each time their energization changes, the rotor is caused to advance an incremental are related to the number of poles and the tooth pitches.

In order to provide a permanent magnetic field, the present motor incorporates into the stator, a coil which is energized by direct current to produce a unidirectional magnetic flux. This flux is caused to traverse the poles which also have therein the stator winding produced flux and the two fluxes combine through the air gaps between the rotor and stator teeth to produce the magnetic flux which causes the rotor to incrementally advance upon each change of energization of the stator windings. Thus, the rotor has a low inertia and the permanent magnetic flux may be relatively high as compared to heretofore similar type motors which will accordingly enable an increase in torque and/or stepping rate of the motor.

Other features and advantages will hereinafter appear.

In the drawing:
FIG. 1 is an axial section of the electric stepping motor of the present invention.
FIG. 2 is a section thereof taken on the line 2—2 of FIG. 1.
FIG. 3 is an electrical schematic diagram for energizing the motor of the present invention.

Referring to the drawing, the motor is generally indicated by the reference numeral 10 and has a stator 11 and a rotor 12. The rotor 12 includes a shaft 13 constituting the output shaft of the motor and it is mounted on ball bearings 14 and 15 for rotation. The shaft carries a toothed member 16, which has an axial cross-sectional shape corresponding to the letter H so as to form two cylindrical end caps 17 and 18. Teeth 17a are formed on the cylindrical end cap 17 and teeth 18a are formed on the cylindrical end cap 18. The teeth 17a and 18a are identical to thereby have the same pitch but preferably are rotationally offset from each other by one-half a rotor tooth pitch. The member is shown formed from a single piece of material but if desired may be formed of a plurality of assembled pieces, including laminations. Such material may be bar stock steel but in any event, the member must be formed of material that has high magnetic permeability.

The stator 11 has a pair of disk-shaped end bells 19 and 20 which support the bearings 15 and 14, respectively. An annular cover 21 is disposed between the end bells while screws 22 hold the end bells and annular cover 21 together to form a unitary assembly. As will be hereinafter appreciated the members 19, 20 and 21 are formed of low permeable, non-magnetizable material, such as aluminum.

Positioned against the interior surface of the annular cover 21 is an annular member 23 formed of high magnetic permeable material such as steel and its outer surface is dimensioned to be press fitted against the interior of the cover 21 while its interior surface is sized to press fittingly receive a first stator stack 24 and a second stator stack 25. The stacks 24 and 25 are identical in shape and each is formed from a plurality of steel laminations with the laminations having the shape shown to provide a plurality of inwardly extending poles 26a–26h. As shown in the specific embodiment herein described there are eight equally spaced identical poles, each of which is formed with teeth 26a' on its inner periphery. As the teeth 17a and 18a are arcuately displaced by one-half a tooth pitch, the stator stacks 24 and 25 may accordingly be positioned to have their poles and teeth aligned. Rivets 27 hold the laminations together to form the stacks.

Each of the poles 26 has a winding 28 which encircles the intermediate portion of a pole in the stack 25 and its aligned pole in the stack 24. Thus both poles will be magnetized the same polarity when the winding is energized. As the two stacks have eight poles 26a–26h, there is thus provided eight windings indicated by the reference characters 28a–28h.

The stator stacks 24 and 25 are axially spaced and disposed therebetween is an annular coil 29 formed of insulating wire wound about an annular bobbin 30. The stator stacks 24 and 25 maintain the coil in place therebetween while the ends 30a and 30b of the coil 30 may extend through holes formed in the stack 24. Further, the end cap 19 may be apertured so that the ends of the windings 28 and the coil ends may extend therethrough to enable them to be connected to a source of electrical energy.

It will be understood that with the present construction, the stator produces a magnetic flux in the same manner as described in the reissue patent above noted, while a unidirectional magnetic flux is produced by the coil 29. This unidirectional flux has a path through the annular ring 23, each of the poles of the stator stack 24, the air gap between the teeth of the stack 24 and rotor teeth 17a, the member 16, and the teeth 18a, the air gap between the teeth 18a and the teeth of all the poles of the stator stack 25, and into the annular ring 23. Thus, the magnetic path of the permanent magnetic flux is identical to the path described in the reissue patent except that its source is an electromagnetic coil mounted in the stator rather than a permanent magnet included in the rotor. Accordingly, the rotor member 16 may be of substantially lighter weight to have less inertia and a greater unidirectional magnetic flux may be produced.

As shown in the electrical schematic diagram of FIG. 3, the coil 29 may be energized from a source of D.C. 31 which while shown as batteries may be derived from A.C. by rectifying and filtering. This voltage to the coil 29 may be either of a constant potential (as shown) or may be made to have an adjustable potential as by the use of an adjustable resistance in series with the coil, if desired with the latter, permitting the quantity of magnetic flux produced by the coil 29 to be adjusted. The windings 28a, 28c, 28e and 28g are connected in series to form a first phase while windings 28b, 28d, 28f and 28h are connected in series to form a second phase. Alternate windings of each phase are wound on their associated poles to produce the same magnetic polarity while adjacent windings are wound to effect the opposite polarity magnetization of their associated poles. The two phases are connected to the common and opposite terminals of the center-tap D.C. source 31. Interposed between the D.C. source and the phases is a switching arrangement 32 which provides for changes of energization of the motor in the manner shown in my Pat. No. 3,077,555. Further, when the energization is maintained, the rotor will be magnetically braked at the step to which it was last moved.

While stepping using a manual control is shown, it will also be understood that the motor may be energized directly from A.C. if desired as described in my Reissue Patent above-noted or may be automatically stepped by the use of a semiconductor switching circuit such as disclosed in U.S. Pat. No. 3,117,268, assigned to the asignee of the present invention.

Though the presently described motor is specifically shown with eight poles, it is contemplated that motors having a different number of poles may be made without departing from the present invention and that the teeth of the rotor and stator may have the same or a different pitch.

It will accordingly be appreciated that there has been disclosed an electric stepping motor which is capable of producing an incremental movement for each change of energization of its stator windings. The motor is particularly susceptible to achieving high stepping rates without loss of a step by the use of a rotor that has a low inertia. This is achieved by the use of an electromagnetic coil mounted in the stator which produces a unidirectional magnetic flux that cooperates with the changing flux in the poles produced by the pole windings through the stator and rotor teeth. Thus the motor while still achieving the advantages of both fluxes in the production of torque and directional stability is not hampered by a large rotor inertia.

Variations and modifications may be made within the scope of the invention and portions of the improvements may be used without others.

I claim:

1. An electric stepping motor comprising a stator and a rotor; said rotor including a shaft and a toothed member secured thereon having at least one cylindrical periphery formed with axially extending teeth, said member further being formed from material having relatively high magnetic permeability; said stator including a plurality of inwardly extending poles with the periphery of the poles lying on a circle and being formed with axially extending teeth coaxial and radially aligned with the rotor teeth, a winding on each of the poles for effecting magnetization thereof upon energization and a coil carried by the stator; and means for energizing the coil to produce a unidirectional magnetic flux through the stator poles and toothed member.

2. The invention as defined in claim 1 in which the polarity of magnetization of at least one of the stator poles is altered to provide an incremental movement and in which the coil is maintained continuously energized to maintain the same unidirectional magnetic flux.

3. The invention as defined in claim 1 in which the stator has two spaced apart stacks, each of said stacks having pole forming members, in which the coil is positioned between the two stacks and in which the toothed member has two cylindrical peripheries formed with teeth with the peripheries being spaced apart to be in alignment with the two stacks.

4. The invention as defined in claim 3 in which the stacks have a cylindrical outer periphery, the coil is annular and in which there is an annular member formed of relatively high permeable material in magnetic association with the periphery of the stacks and the coil.

5. The invention as defined in claim 4 in which the stator includes a pair of end bells and an annular cover, said end bells having means for supporting the rotor for rotation, in which said cover encloses the annular member and in which the end bells and cover are formed of material having low permeability.

References Cited

UNITED STATES PATENTS

| Re. 25,445 | 9/1963 | Fredrickson | 310—163 |
| 3,075,108 | 1/1963 | Fehn | 310—126 |
| 3,077,555 | 2/1963 | Fredrickson | 318—254 |
| 3,117,268 | 1/1964 | Madsen | 318—283 |
| 3,206,623 | 9/1965 | Snowdon | 310—162 |
| 3,293,459 | 12/1966 | Kreuter et al. | 310—49 |

WARREN E. RAY, Primary Examiner

U.S. Cl. X.R.

310—114; 318—138